United States Patent [19]

P. R. Mallery & Co. Inc.

[11] 4,087,595
[45] May 2, 1978

[54] MULTI-CELL BATTERY AND METHOD OF MAKING

[75] Inventor: P. R. Mallery & Co. Inc., Ossining, N.Y.

[73] Assignee: P.R. Mallory & Co. Inc., Indianapolis, Ind.

[21] Appl. No.: 649,373

[22] Filed: Jan. 15, 1976

Related U.S. Application Data

[63] Continuation-in-part of Ser. No. 353,844, Apr. 23, 1973, abandoned.

[51] Int. Cl.² ............................................. H01M 6/46
[52] U.S. Cl. ................................. 429/153; 429/171; 429/174; 29/623.2
[58] Field of Search ............... 136/107, 102, 111, 133; 429/152–155, 171–174; 29/623.2, 623.4

[56] References Cited

U.S. PATENT DOCUMENTS

| | | | |
|---|---|---|---|
| 2,436,382 | 2/1948 | Deibel et al. | 429/153 X |
| 2,463,089 | 3/1949 | Deibel | 429/153 X |
| 2,658,936 | 11/1953 | Rock | 429/153 |
| 3,420,714 | 1/1969 | Knight | 136/107 |
| 3,440,105 | 4/1969 | Yamamoto et al. | 136/111 X |
| 3,442,709 | 5/1969 | Hayase | 136/111 X |
| 3,713,896 | 1/1973 | Feldhake | 429/174 |
| 3,740,271 | 6/1973 | Jammet et al. | 136/107 |
| 3,753,781 | 8/1973 | Parker et al. | 136/107 |

*Primary Examiner*—Charles F. LeFevour
*Attorney, Agent, or Firm*—Ronald S. Cornell; Israel Nissenbaum; Charles W. Hoffmann

[57] ABSTRACT

A battery sealed against electrolyte leakage by surrounding a stack of cells with cylindrical layer of two ply construction with absorbing or blotting paper surrounded by an impervious plastic cylindrical layer, with hot melt plastic plugs at both ends of the cylinder to form a leakproof sealed container for the stack of cells.

7 Claims, 4 Drawing Figures

U.S.Patent   May 2, 1978   4,087,595

MULTI-CELL BATTERY AND METHOD OF MAKING

This is a continuation-in-part of copending application Ser. No. 353,844 filed Apr. 23, 1973 and how abandoned.

This invention relates to multi-cell batteries, and particularly to a method of sealing the batteries internally of an outer housing shell.

One of the problems that arises with electrolyte batteries is the leakage of electrolyte from the cells to the outside of the battery shell or case, which creates an unsightly appearance on the shell case, and raises a question about the integrity of the battery, even though the battery may be entirely operative and adequate for the service for which it is originally intended. Such leakage may occur after a period of as little as three weeks on the shelf.

If leakage could be prevented, two advantages would accrue. First the unsightly appearance of the battery would be eliminated, thereby eliminating any question of doubt about the integity of the battery and its ability to function. A second advantage is that the elimination of leakage from the battery enclosure in the manner described herein permits the use of a simple inexpensive container, instead of the expensive metal container that is conventionally used.

The object of this invention is to provide a sealed battery and a method of sealing it internally that would provide both of those advantages, i.e. stop unsightly leakage that could create doubt about the ability of the battery to perform, and the economical use of a cardboard case.

At present, in one arrangement of cells in a battery, a stack of several cells is disposed in a plastic tube, which serves merely as a retaining tube for the stack. Any electrolyte that leaks out of any cell is not deterred in movement by the plastic tube, which is not absorbent, and therefore the leaking electrolyte can move within the tube to reach the terminals of the cell stack and cause corrosion.

Batteries, generally, are sealed by compression seals which are usually made by crimping the end of a cell containing tube or enclosure made of metal over resilient plastic or rubber seals to enclose contained cells. However, because of the mechanical separation of the elements of the seal, electrolyte leakage, though, retarded, will still occur. Methods of eliminating such mechanical separation as complete encapsulation of the individual cells by plastic are especially detrimental to cells which are sensitive to the high heat required for such encapsulation. This is true for example of zinc/mercuric oxide cells.

To improve the batteries of the prior art this invention involves sealing the battery by enclosing a stack of battery cells in a simple, inexpensive, sealed enclosure. The enclosure consists of a simple bimaterial tube or enclosure to surround a cell stack, with the application of two end plugs of a hot melted plastic material to seal the two ends of the tube or enclosure, with the two cell electrodes of opposite polarity extending out of the two ends of the sealed tube for connection to an external circuit. Thus the electrolyte leakage is substantially eliminated by the single phase, plastic end closure, and the melting temperature of the material is sufficiently low not to deleteriously affect heat sensitive cells.

The bimaterial two-layer tube in this invention consists of an inner layer of absorbent paper or cardboard material and an outer protective layer of plastic material. Any leaking electrolyte from any cell reaches the inner layer of absorbent material and is there absorbed and held against further movement. The whole inner layer of absorbent material is available until saturated by the leaking electrolyte. The two end plugs that close the stack cylinder prevent leakage out of that cylinder.

A laminated tube is preferred over two individual tubes of cardboard and plastic because of problems in obtaining close tolerances for proper insertion and possible swelling of the cardboard in the latter embodiment. The tube and the two end plugs thus enclose the cell stack in such a way that none of the electrolyte that might leak from the cells can seep out of the tube. A simple and inexpensive cardboard case can then be utilized for the battery,. whereas metal casings have theretofore necessarily been employed, because of the corrosive effect of the electrolyte that might leak out of the individual cells.

Though the stack cylinder is sealed against electrolyte leakage the plastic enclosure is permeable to evolved gasses thus enabling the battery to breathe without rupture of the cell casings.

One object of the invention is to provide a battery construction in which the cells are enclosed in a substantially sealed enclosure, to prevent leakage from the battery as a whole, which would create an unsightly appearance, and could create a doubt about the integrity of the battery.

Another object of the invention is to provide a battery and a method of forming the battery, that will permit the use of an inexpensive, absorbent, cardboard casing.

The method of leakage protection utilized here provides a type of operation such that, as any cell exudes or leaks out electrolyte, the electrolyte is soaked up by the absorbent material in the inner wall layer of the tubular enclosure about the battery stack. When the inner absorbent wall becomes saturated by the electrolyte, leakage from the tube is prevented by the provision of a hot melt plug at each end of the tube, which bonds to the absorbent material and the overlaps the end of the tube and completes the insulating bond to the outer wall of the tube, which is also of plastic material. The construction of a battery, and the method of the construction employed in manufacturing the battery, are described in the following specification, in connection with the accompanying drawings, in which FIG. 1 shows the construction of one embodiment of the invention from a front elevation view with the surrounding tube shown in cross-section, and illustrates the principle whereby a hot melted adhesive is applied to serve as a sealing plug for a single stack that is shown for schematic illustration in this figure.

The invention generally involves a new and simple construction of, and a method of manufacturing, a battery of several electrolyte containing cells, in a construction and manner of assembly that will confine any inevitable leakage of the electrolyte cells, so the electrolyte will not be able to come out to the external surface of the battery case.

The invention is generally directed to a construction wherein a stack of cells is disposed within a tubular container with the ends of the tubular container sealed closed with a hot melt seal that seals the end edges of the tubular element internally and externally to prevent any leakage of the electrolyte that might leak out of the individual cells in the tubular enclosure. By eliminating the possibility of the leakage of electrolyte from such container to the outside of the battery case it becomes possible to use a less expensive cardboard case to enclose the entire battery, which case otherwise would have to be of a material, such as a more expensive plastic or metal, that could withstand the corrosive effect of the electrolyte if any should leak out of the cell enclosure.

Figure 1:
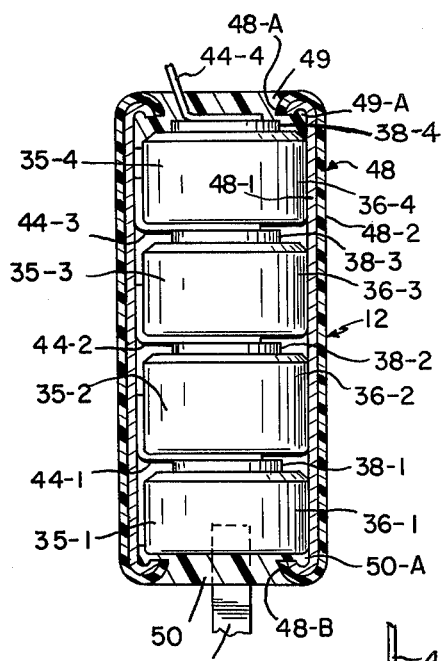

FIG. 1 shows the details of the stack assembly 12. The four cells 35-1 through 35-4 are connected in series, and are of a type in which the outside container of metal 36-1 to 4 is to serve as one polar terminal of the cell, while the other polar terminal 38-1 to 4 is disposed as a circular button.

Each cell is connected to the next upper cell through a connecting tab, as shown in the series 44-1 through 44-3 and tab 44-4 leads to an external connection. The bottom tab 44-0, in FIG. 1, is shown welded to the outer surface of the can of cell 35-1, and series for connection such as to the bottom cell of the stack 14, shown in FIG. 3. After the four cells in stack 12 are connected by tabs 44-1 to 44-3, a tube 48 is slipped over the stack. The tube 48, shown as a cylinder, may alternatively be a simple wrap-around to be more easily applied for slight variations in dimensions in the assembly of the cells of the stack. The tube 48, whether as a closed cylinder, or as a wrap-around is a laminate of cardboard and plastic, with the cardboard as the inside element engaging the cells, and the plastic element on the outside of the wrap. In the embodiment shown the cardboard is an electrical grade kraft paper and the plastic is polystyrene. Where a wrap-around arrangement is used, a simple industrial tape may be used to hold the wrap-around closed thereafter, the tube is crimped inwardly at the ends and the stack is then sealed by pouring a small quantity of hot melt plastic into each end of the tube 48, to form sealing plugs 49 and 50. The hot melt plastic will flow readily to engage, and adhere to, all exposed top or bottom surfaces of the cell and the connecting tabs and the tube or wrap-around 48. Any alkali resistant material which is capable of flowing when heated and which will adhere to the material of tube 48 may be used to form the sealing plugs 49, 50. The hot melt plastic material used in this embodiment is a polyterpene resin with an ethylene-vinyl acetate base which is a commercial material sold as Swift's Y-625 hot melt adhesive. The material has a softening point of 212° F and a viscosity of 21.2 p at 300° F. The material solidifies and retains the shape formed by the free flow at high temperature. When solidified, the plastic plug fits closely to the surface of everything it touches, and thus provides a leakproof seal.

To obtain maximum benefit of the sealing plugs at the ends of the stack tubes, the tubes are preferably crimped inwardly, as shown in FIG. 1, so that the hot melt, when poured into the ends of the tubes, will flow into the space under the crimped ends 48A and 48B of the tube. When the poured melt solidifies at room temperature, it will thereby form and embody anchoring grip flanges 49-A and 50-A.

As mentioned, the wrap-around or tube 48 has an inner laminate 48-1 of absorbent material, and a plastic outer element 48-2 which prevents any transmission or through movement of electrolyte. Electrolyte that might leak out of any of the cells 35-1 through 35-4 will be absorbed by the blotting action of the absorbent material 48-1, and will be restrained against any further movement. By thus absorbing and retaining any leaking electrolyte, in place within the enclosure, none of the electrolyte is permitted to pass outside to the cell enclosure or battery case, and the original clean appearance of the battery case is retained.

Similarly, the blotting action of the inner layer 48-1, of the tube or wraparound 48, moves all of the electrolyte away from the cell surfaces, so that any internal short circuit conditions, that heretofore could occur, are now suppressed and eliminated.

Further, where any previous wrap-around or tube that was employed consisted solely of a plastic layer, any of the electrolyte that did leak out of the cell would seep along the plastic surface to the outer metal surfaces, and gradually and ultimately would engage and strike the terminals and cause them to corrode due to the action of the electrolyte itself. In conventional practice the plastic wrap-around served merely as an insulator but not as a deterrent to electrolyte movement because it was non-absorbing to the electrolyte.

A feature of the present invention is the disposition of the absorbent material, directly at the region where the electrolyte might leak out of a cell, whereupon the absorbent material acts immediately, by its absorbing action, to remove electrolyte from committing its corrosive action.

Even when the cardboard wall 48-1 of tube 48 becomes saturated, the electrolyte is prevented from emerging along the tube wall and out of the tube, by the hot melt plugs 49 and 50. Thus, the stack of cells constituting a battery is structurally contained and enclosed within a sealed container so that no electrolyte may seep to the outside of the container.

Figure 2:
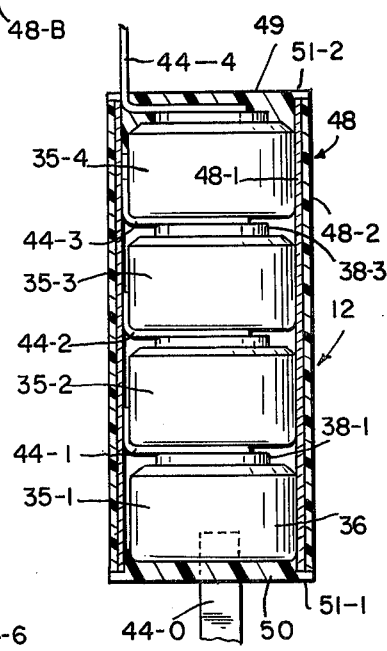
FIG. 2 shows a front elevation in partial cross-section of a second embodiment of the full stack of FIG. 1 with the surrounding tube shown open and sealed without crimping.

FIG. 2 shows another embodiment of the battery in which the hot melt plastic is applied without any prior crimping of the tube. This procedure is preferable for use with non-circular tubes since crimping around corners could lead to manufacturing difficulties. The hot melt plastic overlaps the ends of the tube 51-1 and 51-2 in order that a more cohesive plastic to plastic bond be formed as well as to completely cover the ends of the cardboard inner layer 48-1 of the tube 48 to prevent leakage at those points if the cardboard should become saturated with electrolyte.

Figure 3:
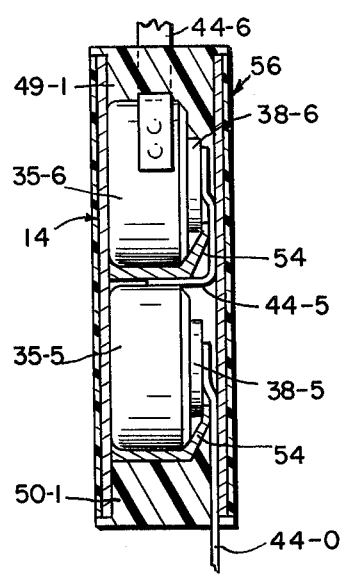
FIG. 3 shows a side view, partially in elevation, and partially in section, of a stack in which two cells are side by side in vertical alignment.

FIG. 3 shows an arrangement wherein two cells 35-5 and 35-6 are connected as a stack and suitably insulated and enclosed within a similar double laminated tube 56, similar to tube, or wrap-around, 48 of FIG. 2. The two cells 35-5 and and 35-6 are shown electrically interconnected by a tab 44-5. The bottom terminal strip 44-0 can be used to connect to, and will then be part of, the correspondingly numbered strip 44-0 in FIGS. 1 and 2. A top connecting tab strip 44-6 serves as the second terminal of the battery for connection to terminal 32 (FIG. 4) and to an external circuit. This stack in FIG. 3 is similarly treated, as was described in connection with the stack in FIG. 2, and is provided with two sealing plugs 49-1 and 50-1 formed at the two ends of the stack tube 56 to close and seal that tube.

The two plugs 49-1 and 50-1 seal off the ends of tube 56, and seal to the tab strips 44-6 and 44-0 respectively. In the cell arrangement shown in FIG. 3 insulating separators 54 are shown disposed between the two cells 35-5 and 35-6 to prevent short circuiting between the two cells and below cell 35-5 to prevent intracell shorting during cell production.

Figure 4:
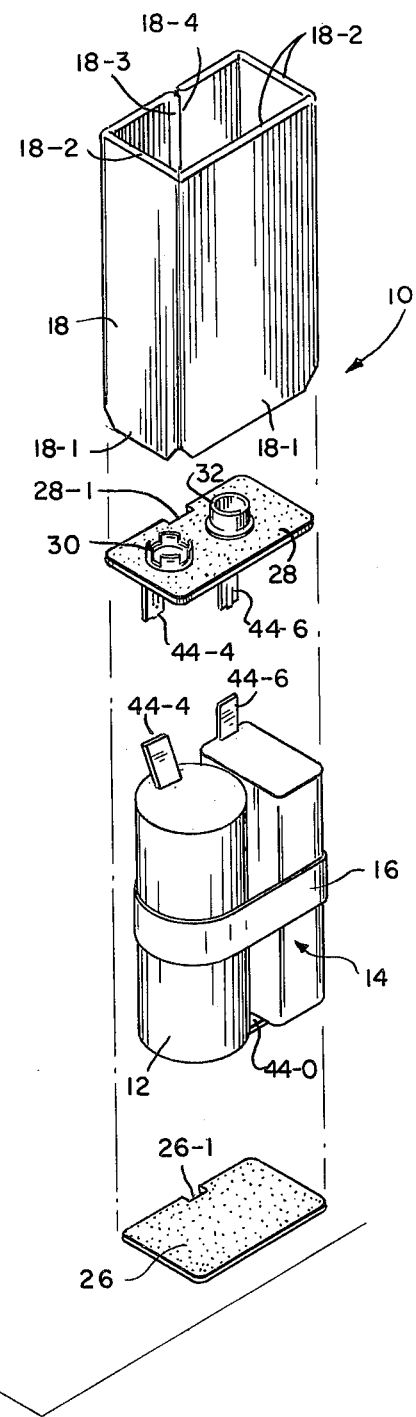
FIG. 4 shows an exploded view of a multi-cell battery to which the present invention is applied.

In FIG. 4, a conventional battery 10 is shown in exploded view as having the two enclosed stacks 12 and 14 of FIGS. 2 and 3 appropriately banded together with a strip of tape 16 for mutual support. The two stacks 12 and 14 are electrically interconnected by a bottom cross tab 44-0 and are respectively provided with two top tabs 44-4 and 44-6 for connection to an external circuit to which energy is to be supplied from the battery.

When the two cell stacks 12 and 14, held together as a unit, are inserted into an outer cardboard shell 18, a fibreboard plate 26 and a fibreboard terminal board 28 are disposed at the respective two ends of the stack, and the end edges of the shell 18 are then folded over the two fibreboards 26 and 28, to complete the battery assembly with the two boards 26 and 28 serving to hold the two stacks 12 and 14 stationary within the shell 18.

The end edges 18-1 and 18-2 of the shell 18 are mitered at the corners in order to permit those edges to be easily folded over to lock the two fibreboards 26 and 28 in place.

The two fibreboards 26 and 28 are shown provided with edge notches 26-1 and 28-1 to receive and accommodate longitudinal seam edges 18-3 and 18-4 of the outer shell 18. The two side seam edges 18-3 and 18-4 are folded together to close the shell along those edges, which later fit within the two side notches 26-1 and 28-1, when the top and the bottom fibreboards are place in position.

Supported on the upper fibreboard 28, are two electrode terminals 30 and 32, provided for connection to an external circuit, and are connected to the respective terminals of the electric cells in the two stacks, through the two top tabs 44-4 and 44-6, shown broken away for convenience in the exploded view.

Thus, a construction and method of manufacturing an improved battery is disclosed, that prevents any electrolyte from leaking to an outer case and spoiling the appearance of a battery, and thereby causing a doubt about its effectiveness, which usually results in the discarding of the battery which might, nevertheless, be quite capable of doing the work for which it was intended. At the same time, this construction provides for eliminating or substantially suppressing a short circuit condition, by the very simple operation of blotting the electrolyte away from the cell, before it can do any damage to any sensitive surfaces by corrosive effects.

Consequently, the shelf life of the battery is indefinitely increased to the extent of removing and suppressing harmful appearance, or harmful effects, of any leaking electrolyte.

The invention disclosed herein provides an assembly to also meet the space limitations imposed by present conventional standards in respect to this type of battery, but obviously other arrangements may be employed without departing from the spirit or scope of the invention, as defined in the claims.

What is claimed is:

1. A multi-cell electric battery, comprising a plurality of electrolyte containing cells, with electrical interconnections between the cells and end tabs for the outer cells for connection to an external circuit, disposed within an insulating plastic tube impervious to the electrolyte originally open at both ends; and means for substantially completely sealing the cells within said tube wherein said means includes a hot-melt plastic adhesive material which is adheringly bonded to said insulating tube at said open ends with said plastic material forming end plugs which substantially completely sealingly close said open ends.

2. A multi-cell electric battery, as in claim 1, in which said plastic insulating tube encircling said cells includes an inner layer of absorbent material adapted to absorb any electrolyte that leaks from the individual cells to which absorbent material and plastic said sealing end plugs adhere, to cooperate to confine said electrolyte leakage.

3. A multi-cell electric battery, as in claim 2 wherein said tube is crimped at both open ends prior to application of the hot-melt plastic adhesive to form said end plugs.

4. A multi-cell electric battery, as in claim 1, in which a housing shell for said sealed, cell containing tube consists of an inexpensive cardboard material, protected from electrolyte leakage of the cells by said sealed insulating tube containing said cells.

5. The method of sealing a multi-cell battery of electrolyte containing cells to prevent electrolyte leakage to the exterior of the battery and to thereby prevent ambiguity and doubt about the operative condition of the battery, comprising:

arranging the cells in appropriate electrical and physical order, partially enclosing the stacked cells in a plastic enclosure impervious to the electrolyte of the cells, substantially completely closing said enclosure with a melted hot-melt plastic adhesive material and allowing said adhesive material to solidify to substantially completely seal said enclosure so that no electrolyte can leak out of said enclosure.

6. The method of claim 5, in which
said enclosure is formed as a tube including an inner layer of electrolyte absorbing material.

7. A multi-cell electric battery as in claim 1 wherein said hot-melt plastic adhesive is a polyterpene resin.

* * * * *

UNITED STATES PATENT AND TRADEMARK OFFICE
CERTIFICATE OF CORRECTION

PATENT NO. : 4,087,595
DATED : May 2, 1978
INVENTOR(S) : Frank L. Ciliberti, Jr.

It is certified that error appears in the above-identified patent and that said Letters Patent are hereby corrected as shown below:

In the designations of inventor, Items 19 and 75, correct the identification of the inventor from ---P.R. Mallery & Co. Inc.--- to "Frank L. Ciliberti, Jr.".

Column 1, line 6, change ---how--- to "now".

Column 1, line 49, delete the comma after "though".

Column 1, line 54, delete the hyphen "-" after "zinc".

Column 2, line 19, change ---theretofore--- to "heretofore".

Signed and Sealed this

Twenty-ninth Day of August 1978

[SEAL]

Attest:

RUTH C. MASON
Attesting Officer

DONALD W. BANNER
Commissioner of Patents and Trademarks